July 8, 1930.  F. R. DIPPMAN ET AL  1,770,229
TROLLEY POLE BASE
Filed June 12, 1928   2 Sheets-Sheet 1

Witness
H. J. Stromberger

Inventor
FRED R. DIPPMAN
EDGAR D. MOORE
By
Attorney

July 8, 1930. F. R. DIPPMAN ET AL 1,770,229
TROLLEY POLE BASE
Filed June 12, 1928 2 Sheets-Sheet 2

Witness
H. J. Stromberger

Inventor
FRED R. DIPPMAN
EDGAR D. MOORE
By
Attorney

Patented July 8, 1930

1,770,229

UNITED STATES PATENT OFFICE

FRED R. DIPPMAN AND EDGAR D. MOORE, OF MANSFIELD, OHIO, ASSIGNORS TO THE OHIO BRASS COMPANY, OF MANSFIELD, OHIO, A CORPORATION OF NEW JERSEY

TROLLEY-POLE BASE

Application filed June 12, 1928. Serial No. 284,305.

Our invention relates to a trolley pole base for use in connection with vehicles deriving their source of power from an overhead trolley wire.

The object of our invention is to provide a trolley base and the method of manufacturing the same which shall be light in weight yet strong enough to withstand the normal wear and tear thereon and the abuse to which a device of this character is subjected.

Another object is to provide a base which is quick to respond to the various movements required of it with respect to the car upon which it is mounted due to the relative movement of the car and overhead trolley wire.

Another object of our invention is to provide a trolley base and the method of manufacturing the same in which the manufacturing defects usually found in such a device, such as casting cracks, blow holes, shrinks and draws, are eliminated and an increased factor of safety is secured without an increase in weight or sacrifice of its other requirements.

Another object of our invention is to provide a base and the method of manufacturing the same constructed of low priced rolled steel or wire in place of high priced castings and in which the various parts are formed up out of the rolled material and welded together preferably by the arc or oxyacetylene welding process.

By our process of constructing a trolley base, we are able to take a design of standard construction made of castings, as is the present practise, and substitute therefor parts made of rolled or forged material and welded together and produce a base which is of equivalent design and comparatively light in weight, as, for instance, one type of base now on the market and made of castings, we have duplicated and reduced the weight by 35% without sacrificing any of the requirements of the base, but improving the operation of the base in many respects.

Also, in the particular base just referred to, we have found it possible to reduce the tension on the springs for yieldingly maintaining the pole in proper position by 50%. This means reduced pressure against the trolley wire, hence reduced wear and tear upon the trolley wire and the current collector in contact therewith.

The material of which we prefer to construct our base possesses more elasticity or resiliency than castings and, therefore, the base tends to absorb the shocks more readily through a flying pole striking a span wire or overhead obstructions than a base made of castings.

Since the moving parts of the base controlled by the springs are materially reduced in weight, the pole responds more readily to variations in the overhead obstructions with which the current collector contacts even though the spring pressure tending to move the pole upwardly is materially reduced and this also tends to reduce the hammerblow upon the overhead structure as the current collector passes the various supports, splicers, etc., used in constructing a trolley line.

The material of which the base is constructed possesses greater resiliency than one made of castings through the fact that rolled iron and steel are practically free from flaws or defects of a character which would affect the construction of our base, but this is not true of a base constructed of castings as such castings are liable to possess many defects which do not manifest themselves until the base has been in use and subjected to commercial service. The material of which we construct our base has a definite strength per unit area of cross-section and such strength can be relied upon to be repeated in all material used, but this is not true of castings as there are many factors which affect the uniformity and quality.

The raw material from which we fabricate practically all parts of our base can be purchased for practically one-third the price per pound that malleableized iron or steel castings can be procured for. We find that a less amount of rolled steel or iron is necessary for the same strength and factor of safety than where the parts are made of castings and this results in a considerable saving in weight, therefore bringing the cost of the material which goes into our base very much below that of the material which goes into a base constructed of castings.

This saving in material and the cost thereof is offset to some extent by increased labor, but not anywhere sufficient to bring the cost of the device up to that of a device made of castings.

Also, we find that the equipment required to manufacture our base is very simple as we require no patterns other than for a single part, as later explained, and practically every factory at the present day has one or more welding outfits in use, therefore we require no special machinery or tools as in the case with a base constructed of castings.

In the drawings accompanying this specification:

Figure 1:
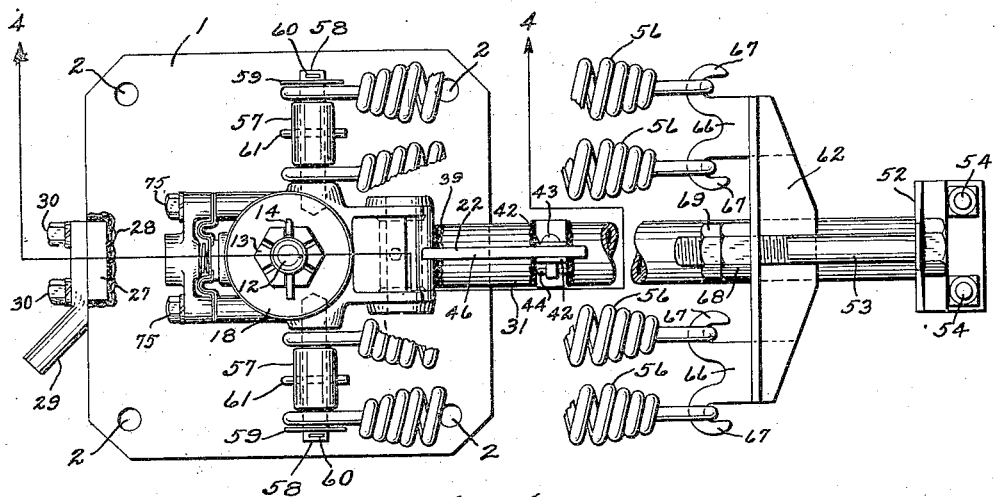
Fig. 1 is a top plan view of our invention with some of the parts broken away.
Figure 2:
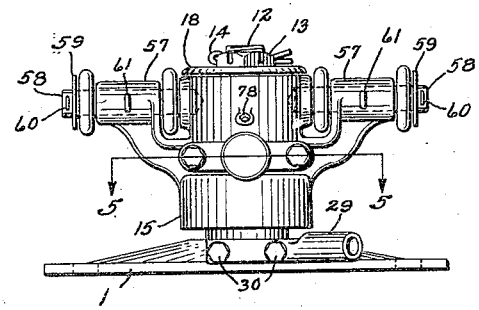
Fig. 2 is a one end view of Fig. 1.
Figure 5:
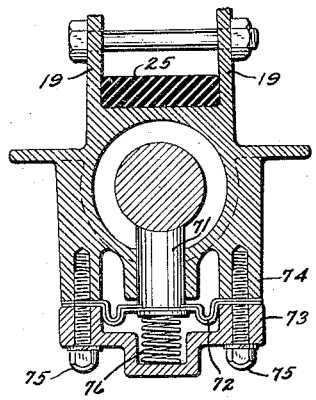
Fig. 5 is a sectional view of the turret and pedestal taken on the line 5—5 of Fig. 2.
Figure 3:
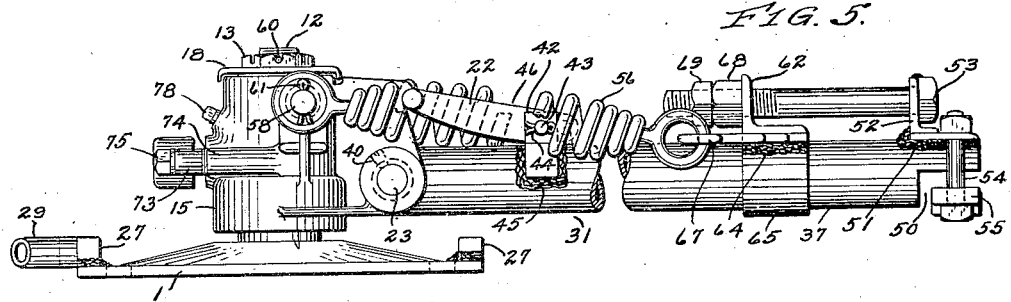
Fig. 3 is a side view in elevation of Fig. 1.

In the preferred embodiment of our invention and the process of constructing the same, we employ a base member 1 formed up of rolled sheet steel or iron of proper dimensions and thickness to give the required strength and support, and such plate is provided with through openings 2 to receive bolts for securing the device to the car roof. The plate 1 is somewhat domeshaped or concaved as this gives added strength and stiffness and in order to strengthen the plate at the center where the upright pedestal 3 is secured, a washer 4 is provided which is formed up out of sheet iron or steel and which has a periphery welded to the plate 1 as at 5.

Wherever we use the term steel, it may be considered that we apply the term in a broad sense to include also iron. Also, when we speak of the parts being welded, we have in mind that the same is carried out by means of the oxyacetylene flame or by the electric arc, using either the metallic electrode or the carbon arc or other similar means of welding and which processes are well known to those skilled in the art and are used extensively in the various arts at the present day.

We find that a base plate composed of the members 1 and 4 has a somewhat elastic property which permits the base to yield somewhat under the variable strains to which it is subjected and by building the base plate up of the part 1 reinforced by the part 4, we save metal as against increasing the thickness of the plate 1 throughout its area.

The pedestal 3 is formed from a piece of solid rolled or drawn stock and we prefer to have a shoulder 6 at the lower end and the pedestal is projected through the opening in the plates 1 and 4 and welded about its periphery to the plate 4.

The pedestal 3 may be constructed from tubing of proper thickness by rolling and drawing operations to produce the various shapes and dimensions thereon if the quantity required is sufficient to pay for the tools, but with automatic lathes, which are standard equipment nowadays, pedestal 3 can be constructed quite inexpensively from solid rolled or drawn stock.

The pedestal is formed with a shoulder 8 for supporting the ball or roller bearing 9 and with a reduced portion 10 upon which is mounted the ball or roller bearing 11. The roller bearings are made with a slightly forced fit upon the pedestal sufficient to prevent the races from rotating upon the pedestal. The pedestal is also provided with a further reduced portion 12 which is threaded and drilled to receive the castellated nut 13 and spring cotter 14.

Mounted upon the pedestal 3 through the medium of the bearings 9 and 11 is a turret member 15 which due to its very irregular shape and thickness of parts at various points, we find can be constructed to better advantage from steel or malleableized iron.

The turret 15 comprises a hollow tubular member having a shoulder 16 supported by the bearing 9. Also, a flange 17 upon which rests the bearing 11. In order to maintain the turret and bearing in position upon the pedestal, I employ a washer or plate 18 of rolled material having an orifice thereon to receive the reduced portion 12 of the pedestal and adapted to rest upon the inner race of the bearing 11.

When the described parts are assembled the washer 18 presses upon the bearing 11, which in turn is supported by the shoulder 17 and the turret 3 and this tends to hold the turret down into position with the shoulder 16 resting upon the bearing 9 and which bearing in turn rests upon the shoulder 8 and is held in that position. The castellated nut 13 adjustable with respect to the plate 18 engages the plate 18 and holds it in position, thereby adjusting the pressure upon the various parts described and the spring cotter 14 maintains the nut 13 in its adjusted position.

Projecting laterally from the same side of the turret 3 are two spaced lugs 19 connected by a transverse flange 20 and having formed along their outer edge adjacent the top, a hook 21 to be engaged by the holding device 22, as later described. The lower ends of the lugs 19 are each provided with a passage therethrough to receive the axle 23.

Positioned between the lugs 19, the flange 20 and shoulder 24 is a body of elastic rubber 25 having the resiliency, elasticity and toughness of what is known as car spring rubber. This body of rubber is so tensioned as to require considerable pressure to place it in position in order that it will be retained therein. We find that this material is superior to a steel spring in that it causes a much less rebound to the pole when the pole leaves the overhead construction and is much lighter and requires less space than steel spring of proper capacity. This body of rubber appears to absorb the shock or blow thereon due to a flying pole and the rebound to the pole is very slight. Therefore, the stress upon the other parts of the base seems to be considerably reduced as against the use of a steel spring.

One exposed face of the rubber buffer 25, as indicated by the arrow 26, is obliquely disposed and the movable arm of the base strikes this oblique face in the case of a flying pole at practically right angles thereto.

Mounted upon the base plate 1 are lugs 27 formed of steel or a non-ferrous metal and welded thereto as at 28. These lugs are drilled to receive cable terminals 29 and held to the lugs 27 by means of the cap screws 30.

Figure 12:
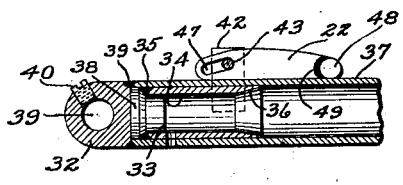
Fig. 12 is a sectional view of the hinged end of the trolley pole holding device.
Figure 11:
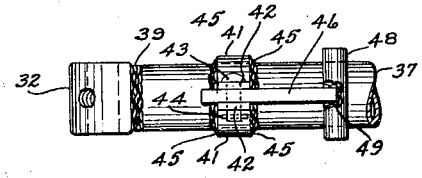
Fig. 11 is a top plan view of the hinged end of the trolley pole holding portion and the hold-down device.

Secured to the turret between the lugs 19 by means of the pin 23 is the arm 31 movable parallel to the base in a vertical plane. This arm comprises a hinge member 32 (see Figs. 11—12) formed up out of a rectangular bar of steel or it may be forged in dies if the quantity warrants the equipment, and is provided with a projecting portion 33 to receive a sleeve 34 and welded together at the point 35. The sleeve has an inner tapering portion 36 at the end remote from the hinge 32 to receive the end of a trolley pole in a wedging relation and tending to center the end of the pole within the arm 31. It will be evident that this construction will hold the end of the pole absolutely firm and centered so long as the pole cannot move longitudinally away from the member 34.

Surrounding the member 34, which is formed of steel tubing or sheet metal rolled into a tube, is another tubular member 37 which extends over a large portion 38 of the hinge member 32 and is welded thereto at 39. The member 37 is preferably formed of seamless steel tubing or pipe stock, which may be formed up of sheet metal and welded along the seam. The parts 34 and 37 fit each other quite closely as the member 34 is intended to reinforce the member 37 at the hinge and as well as to receive and center the trolley pole and thereby is secured a stronger union of the members 32 and 37. The member 32 is provided with a passage 39 through which passes the pin 23 and which is held in place by means of a headless set screw 40 such that the pin rotates with the hinge member 32, although the set screw may be used in connection with the lugs 19 to engage the pin 23 if desired.

Mounted upon the tubular arm 37 are two members 41 formed up out of bar steel with a portion to fit the tube 37 and upstanding or projecting portions 42 spaced apart and with a rivet or bolt 43 therethrough held in place by the cotter 44. The members 41 are welded to the tube 37 as indicated at 45.

Mounted upon the rivet 43 is the hold-down device 22 operated at will by the motorman to engage with or be disengaged from the hook 21 to hold the pole in a practically horizontal position or to allow it to operate freely in a vertical plane.

Figure 4:
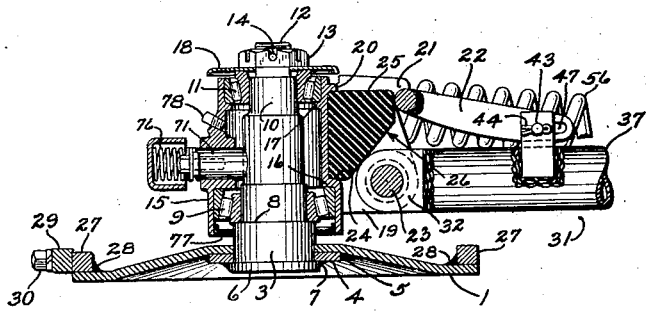
Fig. 4 is a view in partial section of Fig. 1 on the line 4—4.

The hold-down device 22 comprises a piece of bar steel 46 cut to the shape shown and with the slot 47 therein through which passes the rivet 43 and welded to the opposite end of the bar 46 is a transverse member 48 shown as formed of round bar steel. The welding is indicated at 49. In Fig. 4 the hold-down member is shown in position to hold the pole in a horizontal position while in Fig. 11 it is shown in a released position.

Figure 7:
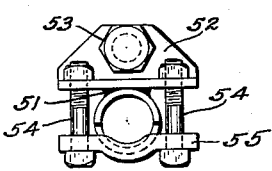
Fig. 7 is an end view of Fig. 6.

To further hold the trolley pole in position within the tubular member 37, the outer end is cut away as shown at 50 and there is welded to the end of the tube 37, as indicated at 51, a stationary angle piece 52 having a hole through one flange to receive the bolt 53 and two holes through the other flange to receive the bolts 54. The upright ends of the angle 52 may be cut on the bias as shown in Fig. 7 if desired or otherwise shaped.

Mounted on the bolts 54 is a yoke member 55 formed up out of bar steel and which rests in the space 50 at the end of the member 37 and is arranged to securely grasp the trolley pole when in position through the medium of the bolts 54 and firmly hold the pole in position.

In order to automatically raise the pole and hold the current collector thereon in contact with the trolley wire in yielding relation thereto, the member 37 is further connected to the turret through the medium of the springs 56.

Projecting on opposite sides of the turret are arms 57 in which are placed studs 58 and upon the exposed portions of studs 58 are secured one end of each spring 56 and the outer spring ends are held in place by means of the washers 59 and spring cotter 60. The studs 58 are held against removal by the cotters 61.

Figure 8:
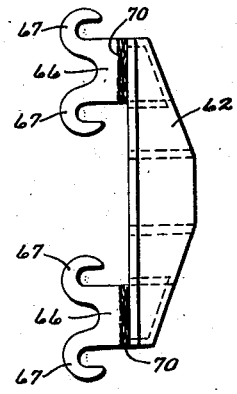
Fig. 8 is a plan view of the adjustable spring holding device.
Figure 6:
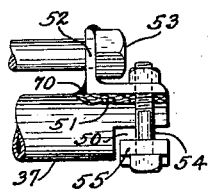
Fig. 6 is a side view of the extreme outer right hand end of Fig. 1.
Figure 10:
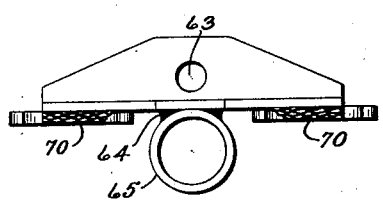
Fig. 10 is an end view of Figs. 8 and 9.
Figure 9:
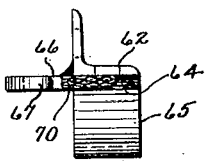
Fig. 9 is a side view of the same.

Adjustably mounted upon the tubular arm 37 is a yoke shaped member 62 arranged to receive the one end of each spring 56. The member 62 is formed up of angle iron or sheet material bent to an angle and has the ends of both the horizontal and upright portions bevelled as shown in Figs. 8 and 10, and the upright portion is formed with a hole 63 therethrough to receive the bolt 53. Welded to the horizontal portion, as indicated at 64, is a tubular collar 65 formed of pipe, seamless steel tube or it may be of sheet material rolled to that shape, and having a sliding fit upon the arm 37. Welded to the horizontal portion are hook members 66 formed up out of sheet steel with the open end hooks 67 arranged to receive the ends of the springs 56.

With the member 62 in position on the tubular arm 37 and the springs in position, the tension upon the springs may be varied at will by means of the nut 68 and lock nut 69. The members 66 are secured to the member 62 by welding as indicated at 70.

In order to properly and efficiently conduct the current from the turret 15 to the pedestal 3, I provide a reciprocating spring held contactor 71 preferably made of copper and having efficiently connected thereto copper leaves 72 which in turn are clamped between the members 73 and 74 by means of the cap screws 75. The spring is indicated at 76. This construction permits the turret to rotate about the vertical axis of the pedestal and shunts a very large portion of the current away from the ball or roller bearings directly to the pedestal, thereby preventing pitting of the bearings.

At the lower end of the turret 15 is a grease and dust ring 77 which consists of a sheet steel washer fitting closely between the turret and pedestal and having a binding sheet upon the turret and secured upon the metal washer is a length of felt which bears against the pedestal. This construction retains any grease that may be within the turret and prevents dust from entering therein. Access to the interior of the turret for the application of grease is secured through the pipe plug 78.

There are, of course, modifications which may be made in the construction and arrangement of the parts herein disclosed, but it is believed we are the first to construct a trolley base in which parts are fabricated from plates, tubes, rods and the like, and the various elements welded in position, thereby forming a much lighter and less expensive trolley base which through its lightness operates more efficiently, and in which a rubber bumper has been substituted for metal springs which secures advantages not derived from a spring, as already pointed out. The turret member 15 could on many forms of bases be very simply and easily made entirely of a built-up structure and even in the design shown the same could be fabricated as the other parts, possibly at some added cost and modification.

The terms sheet steel and iron are used interchangeably as relating to the same thing.

The terms rolled and drawn as applied to steel or iron are considered as equivalents and in the claims we have used the term "structural" as referring to the class of material used, such as rolled, drawn or forged steel or iron as distinguished from castings and the term "structural" does not apply to any particular shape.

We claim:—

1. In a trolley base, the combination with a cast turret member of a fabricated support and a fabricated arm and springs biased to yieldingly hold the arm in an upright position; the support comprising a dished plate of structural steel having an auxiliary plate of structural steel of less area than the first plate and welded along its edge to the first plate, a hole through the two plates to receive a pedestal member projecting upward through the hole and welded to one of the plates, the pedestal formed from structural steel and with means thereon to support an anti-friction bearing, a shoulder within the turret to rest upon the bearing to support the turret and a second shoulder within the turret upon which is supported a second bearing, both bearings surrounding the pedestal and supporting the turret in rotatable relation thereto about the axis of the pedestal member, means formed on the first said plate to secure the base to a car; the pole arm comprising a hinge member formed of structural steel rod and pivotally mounted on the turret and a structural steel tubular member enclosing a portion of the hinge member and welded thereto and a reinforcing tubular member of structural steel positioned within the first tube and enclosing a portion of the hinge member and welded thereto and the free end of the reinforcing tube having its inner surface tapered outwardly to receive and center the end of the trolley pole in wedging relation, a portion of the free end of the first tubular member being cut away and a clamp device secured thereto by welding and comprising a transverse part of structural steel welded to the tubular member and having bolts therein to support a formed up clamp member to grip the pole and held in gripping relation by the bolts.

2. A trolley base comprising in combination a turret member, a support therefor, a pole arm and springs biased to raise the arm; the support comprising a plurality of parts formed of structural steel and welded together; the turret mounted on the support with anti-friction bearings interposed between the support and the turret; the pole arm pivotally mounted on the turret and comprising a plurality of parts formed up of structural steel and welded in place and arranged to clamp the pole in place, secure one end of the springs and adjust the tension thereon; means on the turret to secure the other end of the springs thereto; and a member to receive the impact of the trolley pole when it flies upward and yieldingly arrest its further upward movement.

3. A trolley base having parts formed up of structural steel and welded together, one part comprising a concavo-convex member to be secured to a car and another part comprising a stem projecting from the convex surface of said member.

4. In a trolley base, the combination with a support and a turret mounted thereon to swing about a vertical axis of the support; of a pole arm formed of structural steel tubing cut to length and having a hinge member formed up of steel bar and welded to one end of the tubing, a structural steel member welded to the other end of the tubing and having formed means associated therewith to form an adjustable clamp member to grip the pole in position within the arm and a second structural steel member of a plurality of parts welded together and mounted on the arm in longitudinally adjustable relation thereto and having spring holding means; and means to adjust the second structural steel member; spring holding means on the turret and a spring secured to the holding means to move the arm and pole upward when in a released condition.

5. In a trolley base, the combination with a turret and a pole arm secured thereto to pivot in a vertical plane and springs biased to move the arm about its pivot; of a support comprising a dished member formed up of a steel plate cut to size and shape and having a central hole therein and other holes to secure the member to a car, an auxiliary member shaped from a steel plate and welded to the first member and having a hole to correspond with the first hole, a pedestal member formed of structural steel and projecting through the said holes and welded to the said plates to form a support for the turret; anti-friction bearings interposed between the pedestal member and the turret and supported by the pedestal member and permitting the turret to rotate about the vertical axis of the pedestal member.

6. In a trolley base, the combination with a turret, a pole arm secured thereto to pivot in a vertical plane and springs biased to move the arm about its pivot; of a support comprising a member formed of steel plate and a reinforcing member formed of steel plate and welded to the first member adjacent its center, a hole through the members to receive a pedestal member therethrough and having a shoulder to be welded to the said plates, a shoulder formed on the pedestal member to receive and support an anti-friction bearing mounted on the shoulder; a second anti-friction bearing on the pedestal; the turret mounted on the bearings and arranged to rotate about the vertical axis of the pedestal and means to hold the turret in position on the pedestal.

7. A trolley base comprising a support, a turret mounted thereon, anti-friction bearings interposed between the turret and support, adjustable means to hold the turret on the support, a pole arm formed up of tubular and structural steel parts welded together and having a formed up hinge member welded to the tubular part and secured to the turret to pivot in a vertical plane, springs biased to move the arm upward and a rubber bumper interposed between the pole and turret to receive the upward throw of the pole.

8. A trolley base comprising a support, a turret mounted thereon, anti-friction bearings interposed between the turret and support, a pole arm hinged upon the turret to pivot in a vertical plane, springs biased to move the free end of the arm upward and a yieldable rubber bumper interposed between the arm and one of the aforesaid elements to cushion the upward throw of the arm.

9. A trolley base comprising a support, a turret rotatably mounted on the support and carrying a pole arm pivoted to move in a vertical plane, the pole arm comprising a steel tubing welded to a steel hinge member and a transverse member welded to the end of the arm to carry a pole clamp and springs biased to move the arm upward.

10. A pole arm for a trolley base comprising a tubular pole receiving member of structural steel, a structural steel member at one end to form a hinge, an angular structural steel member at the other end welded to the tubular member in a transverse position and having means to carry a pole clamp thereon, a structural member positioned transverse of the tubular member and a tubular collar of structural steel welded to the transverse member to slide longitudinally upon the tubular receiving member, means welded to the transverse member to secure springs thereto and means to adjust the transverse member longitudinally of the tubular member.

11. A unitary built-up structural steel support member for a trolley base comprising a plate formed up of structural steel and dished at the center with a hole therethrough, an auxiliary plate of smaller dimensions formed of sheet steel and having a hole therethrough, the edge of the smaller plate being welded to the surface of the larger plate with their holes registering, a pedestal member formed up of steel and having a cylindrical outer side surface and projecting through the holes and beyond the surface of one of the plates and having the periphery of the pedestal adjacent one end welded to one of the plates to form a single unit of the said pieces.

12. A unitary built-up structural steel support member for a trolley base comprising a plate formed up of sheet steel with a hole therethrough, an auxiliary plate of smaller dimensions formed of sheet steel and having a hole therethrough, the edge of the smaller plate being welded to the surface of the larger plate with their holes registering, a pedestal member formed up of structural steel and having a cylindrical outer side surface and projecting through the holes and beyond the surface of one of the plates and having the periphery of the pedestal adjacent one end welded to one of the plates to form a single unit of the said pieces.

13. A unitary built-up structural steel support for a trolley base comprising a base plate cut from rolled steel and dished to give it stiffness and a pedestal member formed from rolled steel and projecting therefrom and welded to the base plate.

14. A unitary built-up structural steel support for a trolley base comprising a base plate cut from rolled steel plate and having associated therewith a pedestal member formed from rolled steel and projecting therefrom and welded to the base plate.

15. A unitary structural steel arm for a trolley base comprising a hinge member formed from rolled steel with a transverse opening for a pin, a drawn tubular member with a beveled inner surface to receive the end of a trolley pole welded to the hinge member and a larger drawn tubular member surrounding the first tubular member to receive the trolley pole and welded to the hinge member and means welded on the second tubular member to grip the trolley pole intermediate its ends.

16. A turret for a trolley base comprising a tubular member to receive a support and having means to receive anti-friction bearings therein, arms projecting to receive springs for raising a trolley pole and a rubber bumper positioned adjacent the turret and means secured to the turret to hold the bumper in place and means on the turret to pivotally receive an arm to support a trolley pole from the turret.

17. In a trolley base, the combination with a turret member of a support therefor comprising a plurality of structural steel members formed up and welded together into a unitary structure, a pole arm comprising a plurality of structural steel members formed up and welded together into a unitary structure, means to pivotally secure the arm to the turret and spring means connected between the arm and turret biased to raise the free end of the arm.

18. In a trolley base, the combination with a turret member of a support therefor comprising a plurality of structural steel members formed up and welded together into a unitary structure, yielding means between the support and turret to conduct current from the turret to the support, a pole arm comprising a plurality of structural steel members formed up and welded together into a unitary structure, means to pivotally secure the arm to the turret and spring means connected between the arm and turret biased to raise the free end of the arm.

19. The method of building a trolley base comprising the steps of forming up a plate member of rolled sheet steel and providing a hole therein, forming a pedestal member of structural steel to receive a turret, forming a second smaller plate member with a hole therein and then assembling the plates with the pedestal projecting therefrom through the coinciding holes, then welding around the edge of the smaller plate to fuse and unite it to the larger plate and then fusing and welding the edge of the pedestal to one of the plates, then providing a turret member to be supported by the pedestal with anti-friction bearings therebetween and having arms to receive springs and projecting means to receive a pole arm, then forming up of structural steel a hollow arm with a structural steel reinforcing member at one end, then forming a hinge member of structural steel to cooperate with the projecting means on the turret to pivotally support the arm and then welding the hollow arm and the reinforcing member to the hinge, then forming a clamp member of structural steel with a second clamp member secured thereto by bolts and providing an opening in the first clamp member for an adjusting bolt, then fusing and welding the shape to the end of the hollow arm, then forming of structural steel a member and further forming of plate steel hook-shaped members and welding the hooked members to the ends of the last said member to receive springs also secured to the arms on the turret and providing a hole through the said member to receive the said adjusting bolt.

20. The method of building a trolley base comprising the steps of forming up a plate member of rolled sheet steel and providing a hole therein, forming a pedestal member of structural steel to receive a turret and then assembling the plate with the pedestal projecting therefrom through the hole, then fusing and welding the pedestal to the plate, then providing a turret member to be supported by the pedestal with anti-friction bearings therebetween and having arms to receive springs and projecting means to receive a pole arm, then forming from structural steel a hollow arm with a separately formed structural steel hinge member to cooperate with the projecting means on the turret to pivotally support the arm and welding the hollow arm to the hinge, then forming a clamping member of structural steel with a second clamping member secured thereto and providing an opening in the first clamping member for an adjusting bolt, then fusing and welding the shape to the hollow arm, then forming of structural steel a member and further forming of plate steel hook-shaped members and welding the hooked members to the ends of the last said member to receive springs also secured to the arms on the turret and providing a hole through the said member to receive the said adjusting bolt.

21. The method of forming a trolley pole base consisting in forming a plurality of parts from structural steel and welding them together to form a unitary support for a turret member, then forming a plurality of parts from structural steel and welding them together to form a unitary pole-arm, then pivotally mounting the pole-arm on the turret and then mounting the turret on the support, then forming coiled springs and interposing them between the arm and turret to raise the free end of the arm.

22. In a trolley base, the combination with a turret member, of a support therefor, a pole-arm comprising a plurality of members formed from structural steel and welded together into a unitary structure, means to pivotally secure the arm to the turret and spring means connected between the arm and turret biased to raise the free end of the arm.

23. In combination with a rotatable member having a pole-arm secured thereto to pivot in a vertical plane and springs biased to raise the free end of the arm, of a fabricated support for the rotatable member comprising a plurality of parts formed of structural steel and welded together.

24. A support member for a trolley base comprising a plurality of superimposed parts formed from structural steel and welded together into a unitary structure and a projecting pedestal member welded to the unitary structure to receive an auxiliary rotating structure.

25. A unitary built-up pole-arm for a trolley base comprising a plurality of parts formed up of structural steel and welded together.

26. A trolley base comprising a support and turret mounted thereon to rotate and a pole-arm comprising a plurality of members formed from structural steel and welded together and pivotally secured to the turret, spring means biased to move the free end of the arm upward and means on the turret cooperating with pivotal means formed up and welded to the arm to hold the arm in a lowered position.

27. A trolley base comprising a support, a pole arm supported by the said support and hinged to pivot in a vertical plane and a deformable bumper of elastic material to be engaged by the arm to cushion the upward throw of the arm and a spring biased to move the arm upwardly about its hinge.

In testimony whereof we affix our signatures.

FRED R. DIPPMAN.
EDGAR D. MOORE.